United States Patent
Ruymen et al.

(10) Patent No.: US 12,392,118 B2
(45) Date of Patent: Aug. 19, 2025

(54) PURGE CONTROLLERS FOR PLUMBING SYSTEMS

(71) Applicant: Gen-A-Heater, LLC, Powhatan, VA (US)

(72) Inventors: Agnes Christine Ruymen, Powhatan, VA (US); Stanley Plato, Powhatan, VA (US)

(73) Assignee: Gen-A-Heater, LLC, Powhatan, VA (US)

( * ) Notice: Subject to any disclaimer, the term of this patent is extended or adjusted under 35 U.S.C. 154(b) by 448 days.

(21) Appl. No.: 17/883,760

(22) Filed: Aug. 9, 2022

(65) Prior Publication Data

US 2024/0052607 A1  Feb. 15, 2024

(51) Int. Cl.
*E03B 7/12* (2006.01)
*E03B 7/08* (2006.01)
*G05B 19/416* (2006.01)
*G05D 7/06* (2006.01)

(52) U.S. Cl.
CPC ............... *E03B 7/12* (2013.01); *E03B 7/08* (2013.01); *G05B 19/416* (2013.01); *G05D 7/0623* (2013.01); *G05B 2219/37371* (2013.01)

(58) Field of Classification Search
CPC ... E03B 7/12; E03B 7/08; E03B 7/071; G05B 19/416; G05B 2219/37371; G05D 7/0623; E03C 1/057
See application file for complete search history.

(56) References Cited

U.S. PATENT DOCUMENTS

| | | | | |
|---|---|---|---|---|
| 2011/0290335 | A1* | 12/2011 | Foster | E03B 7/12 137/15.04 |
| 2015/0211648 | A1* | 7/2015 | Frahm, II | F16K 17/28 137/505.42 |
| 2017/0218607 | A1* | 8/2017 | Woods | E03B 7/071 |
| 2017/0350098 | A1* | 12/2017 | McFarlane | E03B 7/12 |
| 2018/0223506 | A1* | 8/2018 | Harb | E03B 7/12 |
| 2020/0024835 | A1* | 1/2020 | Pfeifer | E03B 7/075 |
| 2020/0293072 | A1* | 9/2020 | Ly | F16L 41/023 |
| 2021/0303008 | A1* | 9/2021 | Tanno | G05D 7/0623 |
| 2021/0355660 | A1* | 11/2021 | Belkadhi | E03B 7/10 |

* cited by examiner

*Primary Examiner* — Alicia M. Choi

(57) ABSTRACT

A plumbing system purge controller includes a processor coupled to an interface adaptor having inputs for receiving signals from at least one temperature sensor located, e.g., proximate at least a portion of the plumbing system. The interface adapter is configured for communication with an actuator of a purge valve incorporated within the plumbing system proximate a drain outlet. In operation, if the processor detects signals from the temperature sensor indicating a temperature below a first threshold, it causes the interface adapter to send a purge signal to the of purge valve actuator to purge fluid from the plumbing system. The purge controller is further configured to activate a dedicated standby generator for an associated heating system to provide electrical power to the heating system upon detection of a second threshold temperature from the temperature sensor that is above the first threshold temperature.

17 Claims, 5 Drawing Sheets

THE UTILITY POWER IS RESTORED AND STABLE FOR THE ADJUSTALBE TIME FRAME
THE AUTOMATIC TRANSFER SWITCH TRANSFERS TO THE UTILTIY POSITION

PURGE CONTROLLERS FOR PLUMBING SYSTEMS

FIELD OF THE INVENTION

The invention generally relates to purge controllers for plumbing systems, and more specifically to purge controllers for plumbing systems for use in the prevention of frozen pipes.

BACKGROUND OF THE INVENTION

Many buildings in the United States, especially in those in colder climates, use natural gas, propane, or fuel oil to provide heat and maintain an appropriate temperature. However, even if a building does not use electricity directly to provide heat, such fuel-based systems require electricity to function. In freezing temperatures and without electricity, these systems will not be able to maintain the building at above-freezing temperatures for very long. Thus in such circumstances, water in any pipes within such buildings are at risk of freezing, which could cause the pipes to crack, rupture or otherwise leak. If someone maintaining a building is unaware that a pipe has cracked or ruptured, the resulting leaking of water from such pipes could propose cause costly damage to the building and contents therein.

More recently, the likelihood of frozen pipes and their costly water damage has become an increasing problem due to an increased number of lengthy power outages in the winter months in various parts of the United States that have lasted for several days. A typical solution to this problem for some buildings has been the use of large standby generators to provide power to buildings including their heating systems. However, such generators have disadvantages of often being cost prohibitive and/or require installation footprints with buffer zones for safety purposes that are simply too large for small installation areas available proximate buildings in densely-populated areas. Another typical solution has been the use of portable fuel-powered generators that undesirably require individuals to manually start and refuel such generators for continuous operation during power outages.

Accordingly, a need exists for a solution that protects against frozen pipes and corresponding water damage that does not possess the disadvantages of these conventional solutions.

SUMMARY OF THE INVENTION

Provided is a purge controller that prevents fluid, e.g., water, within a plumbing system from freezing when subjected to freezing temperatures that may exist, for example, during a prolonged utility outage, by purging the fluid from a plumbing system and/or by supplying backup power to the heating system during a utility power failure. Such plumbing system may be a pipe system for providing water to, for example, facets, showers, baths, toilets, and/or hose bibs, as well as a pipe system for circulating fluid to radiant heat systems.

Such purge controller comprises a processor; an interface adaptor coupled to the processor and configured for electrical communication with an actuator of at least one purge valve incorporated within the plumbing system proximate a drain outlet of such plumbing system; at least one temperature sensor coupled to the processor, the temperature sensor for location proximate at least a portion of the plumbing system; and a power input for receiving power from a primary power source to provide power to the processor and the interface adaptor.

In operation of an exemplary embodiment of the purge controller, when the processor receives information from at least one temperature sensor indicating that a corresponding detected temperature dropped below a first threshold temperature, the processor causes the interface adapter to send a purge signal to the actuator of the at least one purge valve to activate such valve and purge fluid, e.g., water, from the plumbing system into the drain outlet. As a consequence, with all or substantially all the fluid purged from the plumbing system prevents such fluid form freezing in the plumbing system causing cracking or rupturing of the pipes of the plumbing system.

In other embodiments of the purge controller, the purge controller includes an air inlet check valve between a portion of the plumbing system and an air source, wherein when pressure within the plumbing system proximate the valve falls below a threshold pressure, the check value opens and admits air from the air source into the plumbing system to facilitate purging of the fluid.

In yet other embodiments of the purge controller, the interface adaptor is adapted for detection of a power loss to the heating system and upon such detection, the processor causes the interface adapter to send a purge signal based, at least in part on, detection of a power loss to the heating system.

In further embodiments of the purge controller, the processor is further configured to cause the interface adaptor to transmit a shutoff signal to at least one actuator of electronically-controllable fluid shutoff valve disposed within the plumbing system proximate at least one fluid source. In yet further embodiments of the purge controller, the processor is adapted to cause the interface adapter to send the shutoff signal to the at least one actuator of electronically-controllable shutoff valve prior to sending the purge signal.

Additionally provided is a purge controller for a multi-zone plumbing system. Such purge controller comprises a processor; an interface adaptor coupled to the processor and configured for electrical communication with for electrical communication with actuators of purge valves within respective zones of the plumbing system proximate drain outlets of such plumbing system; a plurality of temperature sensors with at one of the temperature sensors proximate a respective one of the zones of the plumbing system, with each of the temperature sensors adapted to transmit information to the processor indicative of a temperature proximate said temperature sensor; and a power input for receiving power from a primary power source to provide power to the processor and the interface adaptor. In an exemplary operation of one embodiment of the multi-zone purge controller, the processor receives transmitted information from the at least one temperature sensor in a respective one of the zones indicating that a corresponding detected temperature dropped below a first threshold temperature for such zone. In response, the processor causes the interface adapter to send at least one purge signal to the corresponding actuator of the at least one purge valve within such zone to activate such valve and purge fluid from the zone of such plumbing system into the at least one drain outlet.

BRIEF DESCRIPTION OF THE DRAWINGS

The drawings described below are for illustrative purposes only and are not intended to limit the scope of the invention.

DETAILED DESCRIPTION OF THE INVENTION

Figure 1:
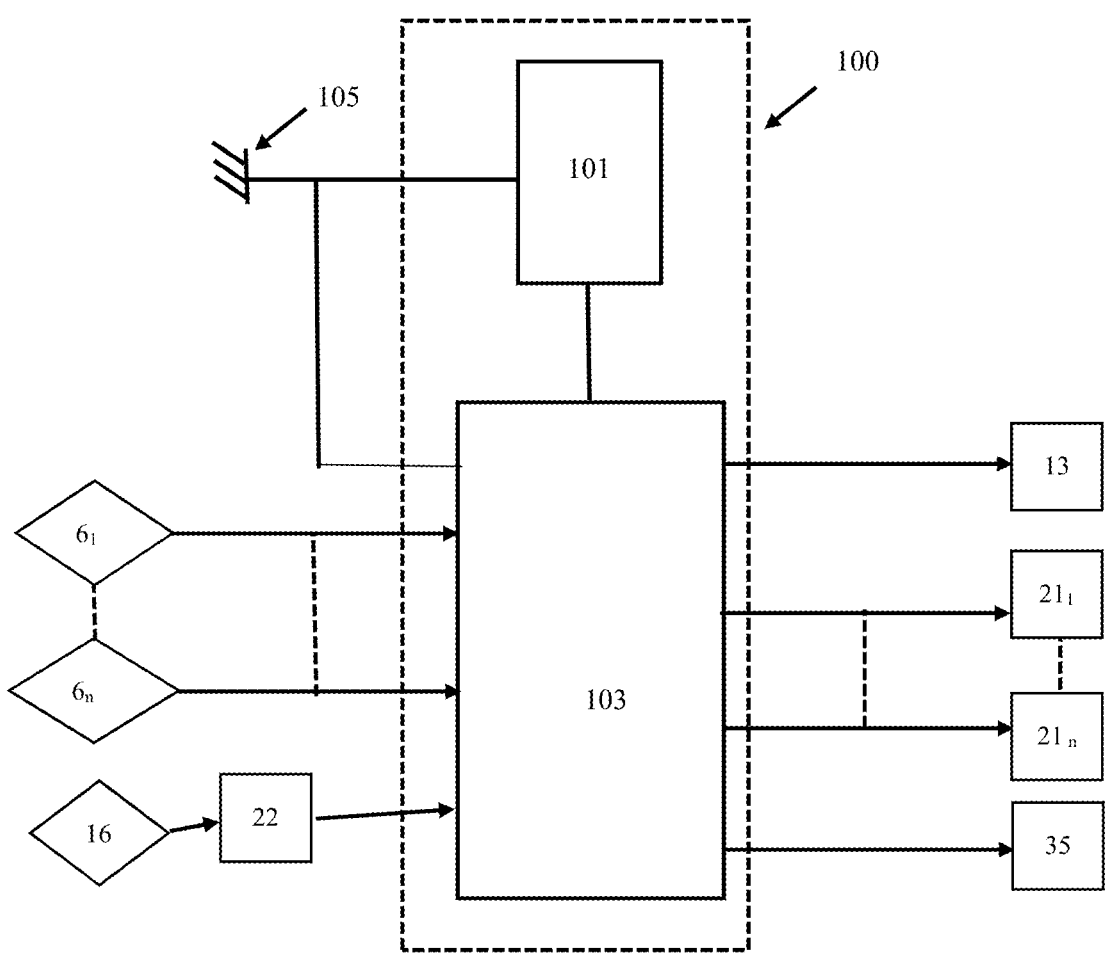
FIG. 1 depicts a schematic block diagram of an exemplary purge controller in accordance with this disclosure for use with a building plumbing system.

It is to be understood that the terminology employed herein is for the purpose of describing particular embodiments, and is not intended to be limiting. Further, although any methods, devices and materials similar or equivalent to those described herein can be used in the practice or testing of the invention, certain methods, devices and materials are now described.

Throughout this application, articles "a" and "an" are used in this disclosure to refer to one or more than one (i.e., to at least one) of the grammatical object of the article.

As used herein, "processor" means a microprocessor, microcontroller, gate array, discrete Boolean logic components, or any other single or group of components that would produce the desired output signals in accordance with the purge controller operation described and/or contemplated by this disclosure.

As used herein, "plumbing system" means a system of fluid conduits from one or more fluid sources to respective points in a building such as, for example, faucets, toilets, showers, bath tubs, hose bibs and fire safety systems, as well fluid conduits and radiators that make up a portion of radiant heat system.

As used herein, "fluid" means water, mixtures of glycol and water, and any other fluid that expands at or near its freezing point.

As used herein, "utility power" is electricity provided from a utility company via its power grid or other similar electrical supply power source.

As used herein, a "fuel-based heating system" is a system which uses fuel to generate heat for heating. Examples of such fuel include propane, natural gas, number 2 fuel oil, or other suitable fuel. Fuel-based heating systems do not include systems in which electricity is used to generate heat. However, most fuel-based heating systems use electricity in some form to assist in generating the heat or circulated the heat to where it is needed including electricity to power, for example, a fan for forced hot air heating systems or recirculation pumps in radiant heat systems.

The disclosure is further illustrated by the following description, which are not to be construed as limiting this disclosure in scope or spirit to the specific procedures herein described. It is to be understood that the descriptions are provided to illustrate certain embodiments and that no limitation to the scope of the disclosure is intended thereby. It is to be further understood that resort may be had to various other embodiments, modifications, and equivalents thereof which may suggest themselves to those skilled in the art without departing from the spirit of the present disclosure and/or scope of the appended claims.

One purpose of the purge controller in accordance with this disclosure is to protect against fluid damage as a result of frozen and then thawed fluid conduction elements, within a building in the event of, for example, a prolonged utility power outage.

In the event of a power outage, many buildings' heating systems will fail or operate so inefficiently that temperatures in such buildings may fall below the temperature at which fluid in plumbing systems therein may freeze, e.g., 32° F., even if the fuel supply to such heating systems are uninterrupted. Consequently, during a power outage in very cold conditions fluid in the conduits, e.g., pipes, within such plumbing system may freeze, burst or crack, which in turn could result in major fluid damage to, for example, the building's ceilings, walls, floors, carpeting, and its contents, such as furniture, electronic devices and other possessions and associated expenses for repair and replacement including access and replacement and/or repair of such conduits.

The present invention provides systems and methods for preventing liquid within plumbing systems from freezing, leaking and/or bursting, subject to freezing temperatures when heating systems are not operational when outdoor temperatures fall below freezing. In some embodiments, provided is a purge controller for use with building plumbing systems and configured to cause purging of the plumbing systems' fluid in certain situations in which the pipes of the plumbing system are at risk of freezing. In other embodiments, provided is a purge controller combined with a generator system configured to provide electrical power to the heating system upon a loss of power from a primary power source.

FIG. 1 depicts a schematic block diagram of an exemplary purge controller 100 for use with a building plumbing system. In FIG. 1, the purge controller comprises a processor 101 configured to send signals to and receive signals from an interface adapter 103, and is powered by power input 105. Interface adapter 103 is configured for electrical communication with one or more purge valve actuators depicted by reference numbers $21_1$ to $21_n$, and one or more temperature sensors depicted by reference numbers $6_1$ to $6_n$. It would be advantageous for the purge valve actuators $21_1$ to $21_n$ to be located within the plumbing system such that when activated the fluid within a corresponding portion or zone of the plumbing system for a respective purge valve would be drained into an associated fluid drain of the building. It is possible to use a single drain for purging more than one portion or zone of the plumbing system.

Primary power is provided to at least the processor 101 and interface adapter 103 of the purge controller 100 via power input 105. It should be readily understood that the temperature sensors $6_1$-$6_n$ may be located proximate one or more corresponding portions of the plumbing system, and adapted to transmit signals indicative of a temperature at their location(s) to the interface adapter 103 and/or processor 101 indicative of a temperature for a location proximate at least a portion of the plumbing system.

The processor 101 is configured such that when it receives transmitted information from at least one of temperature sensor $6_1$-$6_n$, indicating that a detected temperature drops below a first threshold temperature, the processor 101 causes interface adaptor 103 to send a purge signal to one or more of the purge valve actuators $21_1$ to $21_n$ associated with at least the portion of the plumbing system near the temperature sensor detecting such temperature. The corresponding one or more of purge valve actuators $21_1$ to $21_n$ would then open and the corresponding liquid within the associated portions or zones of the plumbing system would flow into one or drains. Consequently, these portion or zone of the plumbing system purged of liquid would no longer be at risk for cracking or leaking due to frozen pipes. Alternatively, the processor 101 may be adapted to causes the interface adaptor 103 to send the purge signal to all the purge valve actuators $21_1$-$21_n$ for draining larger portions of the plumbing for safe measure to further reduce the risk of frozen pipes. In a smaller building, a single temperature sensor 6 and a single purge valve 21 may be sufficient in accordance with this disclosure.

The first threshold temperature may be on the order of, for example, 32° F. to 35° F. However, depending on the typical outdoor temperatures for a given season that the building may experience, such first threshold temperature may be higher or lower including, for example, temperatures in the range of 30° F. to 37° F.

The purge controller 100 may optionally be in communication with an electronically-controllable shutoff valve 13 and/or one or more electronically-controllable air inlet valves 35 via the interface adapter 103. The shutoff valve 13 may be located near a fluid inlet to the plumbing system. The one or more air inlet valve 35 may be disposed for respective portions of the plumbing system at respective air inlets, which may advantageously be at the highest or near highest locations of respective portions of the plumbing system. In operation of such an embodiment, the processor 101 may, when transmitting the purge signal to the one or more of purge valve actuators $21_1$ to $21_n$, also cause the interface adaptor 103 to transmit a shutoff signal to an actuator of an electronically controllable shutoff valve 13 to shut off a corresponding fluid source into the plumbing system to prevent fluid from entering the system while one or more purge valves are open.

In a corresponding manner, when transmitting the purge signal to the one or more of purge valve actuators $21_1$ to $21_n$, the processor 100 may also cause the interface adaptor 103 to transmit to a single to the air inlet valve 35 to open and permit air into the plumbing system to facilitate then draining of such portion or region of the plumbing system. In the alternative, a mechanical check valve may be substituted for one or more of the electronically-controllable air inlet valves 35. In operation, such mechanical check valve would open and admit air into the plumbing system when the fluid pressure drops below the corresponding air pressure at the check valve, such as when fluid is being drained from the system.

Figure 2:
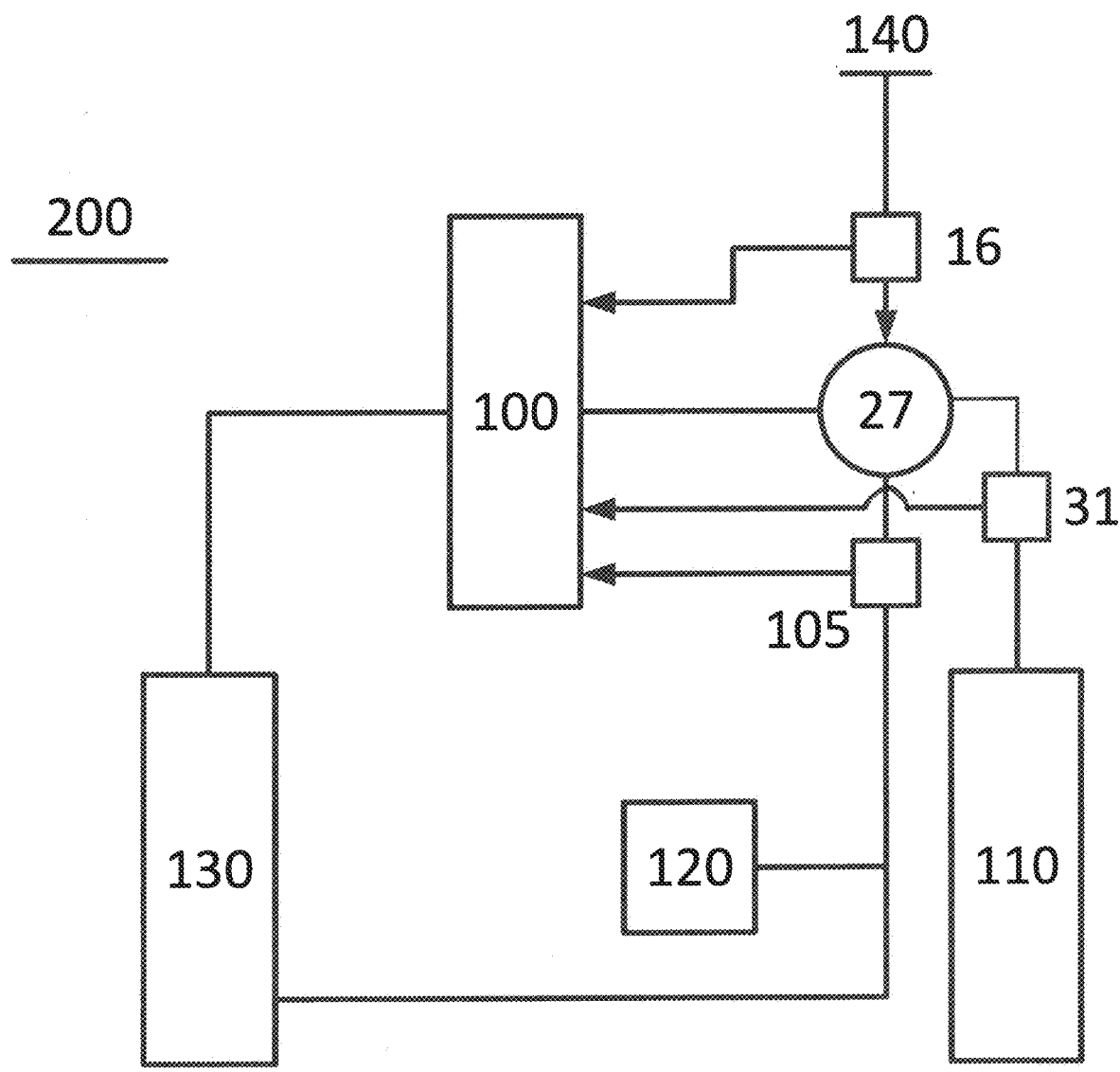
FIG. 2 depicts a schematic block diagram of the exemplary purge controller of FIG. 1 with exemplary heating and plumbing systems.

The interface adapter 103 of the purge controller 100 may optionally be in communication with a voltage sensor 16 associated with the electrical power source of the heating system via a further optional voltage sensor timer 22, which is described in further detail with regard to FIG. 2. In such an exemplary embodiment, the processor 101 causes the interface adapter 103 to send the purge signal based, at least in part, on detected temperature from one or more of the temperature sensors $6_1$-$6_n$ and a detection of power loss to the heating system. The optional voltage sensor timer 22 prevents the processor 101 from detecting loss of power to the heating system in its determination of whether to transmit the purge signal, when such power was only interrupted for only a few minutes.

FIG. 2 depicts a schematic block diagram depicting an exemplary system 200 comprising the purge controller 100 of FIG. 1 with a plumbing system 130 and heating system 120 that utilizes a heating system-dedicated standby electrical generator 110 that operates when power is lost from the utility power 140. In FIG. 2, electrical power provided by the utility power 140 is monitored by voltage sensor 16 and supplied to transfer switch 27. The heating system-dedicated standby electrical generator 110 when activated supplies power to the transfer switch 27, which is monitored by a generator voltage sensor 31. The output of the transfer switch 27 is provided to the above-referenced system power input 105, which supplies electrical power to the heating system 120 and controllable purge values of the plumbing system 130, such as purge valve actuators $21_1$ to $21_n$ depicted in FIG. 1.

The purge controller 100 receives signals from voltage sensors 31 and 16 (via, for example, timer 22 of FIG. 1), and a voltage sensor at power input 105. The purge controller 100 also receives signals for the temperature sensors (not shown in FIG. 2) located in the plumbing system 130, such as for example, temperature sensors $6_1$-$6_n$. The purge controller 100 is also connected to the electrically-controllable purge valve actuator(s) disposed within the plumbing system 130, such as the purge valve actuators $21_1$ to $21_n$, electronically-controllable shutoff valve 13 and/or optional electronically-controllable air inlet valve 35 of FIG. 1.

Figure 3:
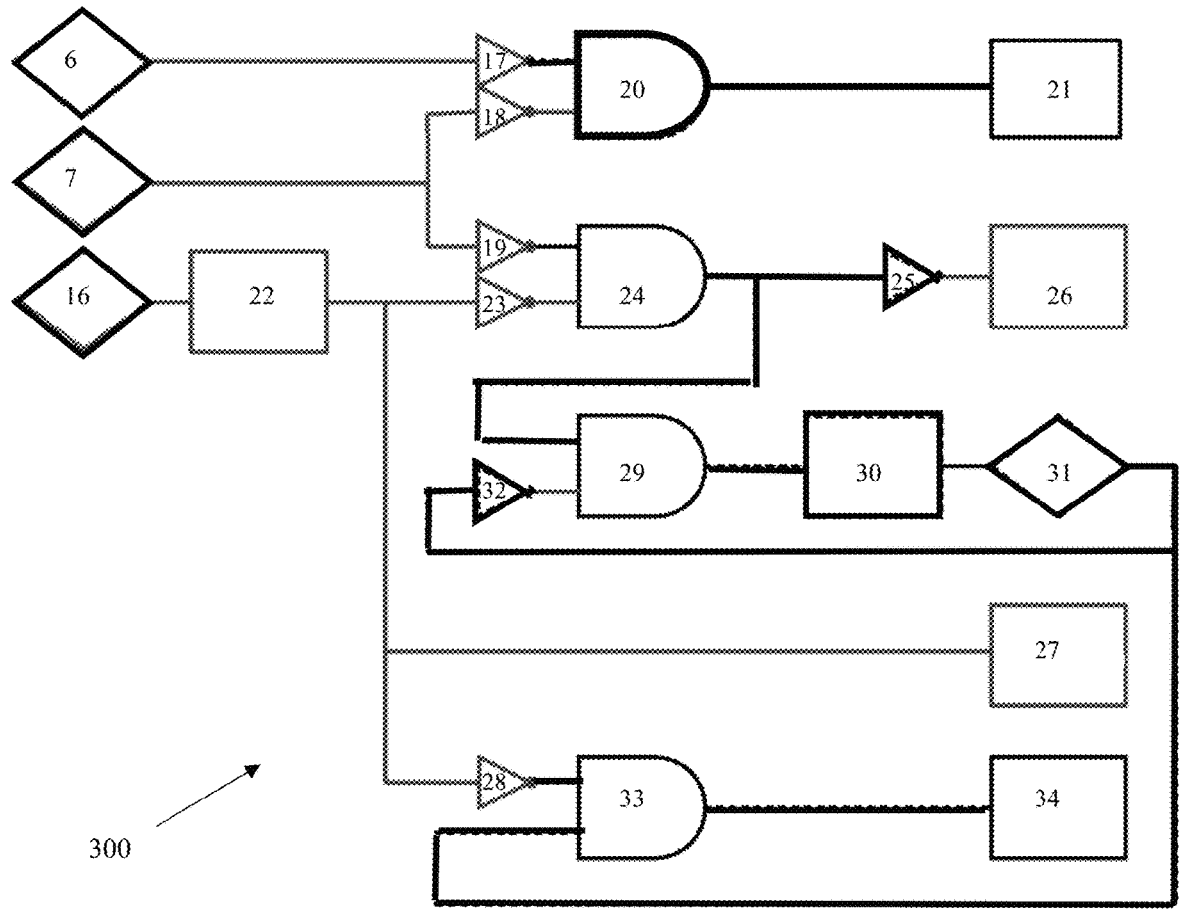
FIG. 3 depicts an exemplary controller logic circuit of an exemplary purge controller.

FIG. 3 depicts a schematic diagram of an exemplary Boolean logic circuit 300 useable for the processor 101 of the controller 100 of FIG. 1 for a plumbing and heating system as depicted, for example, in FIG. 2. Such logic circuit advantageously provides optional control functionality of a dedicated electrical generator, such as generator 110 in FIG. 2, specifically adapted for use with the heating system as described in further detail herein with regard to FIGS. 4-7. It should be understood that the scope of the purge controller in accordance with the disclosure is also intended to cover a purge controller without such optional control functionality, and/or when combined with other control functionality.

In FIG. 3, first and second temperature sensors 6 and 7 transmit a signal, e.g., a voltage signal detected as a logic "1" when the detected temperature is above the threshold temperature set for such sensors. Upon detection of a temperature below the threshold temperature set for such sensors 6 and 7, such sensors cease transmission of, or transmit a signal understood by the purge controller logic circuit 200 as a logic "0." Such signal transmission may be accomplished by the hardware or software of such sensors or intermediate components within or outside of the purge controller.

The temperature sensor 6 is connected, directly or indirectly, to NOT gate 17, and the second temperature sensor 7 is connected, directly or indirectly, to a NOT gates 18 and 19. The NOT gates 17 and 18 are connected, directly or indirectly, to AND gate 20, which is capable of causing the interface adapter 103 to send the purge signals to the one or more of purge valve actuators $21_1$ to $21_n$, shown in FIG. 1. The NOT gate 19 is connected, directly or indirectly, to AND gate 24.

The voltage sensor 16 is capable of transmitting signals to the voltage sensor timer 22 in the manner also depicted in FIG. 1. Upon power loss detected by the sensor 16, the voltage sensor timer 22 will initiate a time for a predetermined duration such as, for example, between five and thirty minutes, and if the detected power loss is continues for that time duration, the timer 22 will then transmit a logic signal indicating such power loss, and not beforehand in this exemplary embodiment. In this embodiment, the output of timer 22 is, directly or indirectly, connected to NOT gates 23 and 28, and automatic transfer switch input 27, which is capable of automatically disconnecting the electrical system in the building from utility power.

The NOT gate 23 is, directly or indirectly, connected to AND gate 24, which is, directly or indirectly, connected to NOT gate 25 and AND gate 29. NOT gate 25 is capable of sending a signal to generator stop signal input 26, and the AND gate 29 is capable of sending a signal to generator start input 30. Generator voltage sensor 31 detects the voltage of the generator, and is, directly or indirectly, connected to AND gate 33 and NOT gate 32. The NOT gate 28 is, directly or indirectly, also connected to AND gate 33. The AND gate 33 is capable of sending a signal to automatic transfer switch input 34 that causes it to power the system by the generator 110.

During operation of the logic circuit 200, as long as utility power is detected by a voltage sensor 16 and/or voltage sensor timer 22, a corresponding signal will be provided to the generator stop signal input 26, thereby preventing the generator from starting. In such operation, when the utility power is detected the system is standing-by waiting for the utility power supply to fail and the second temperature sensor 7 to read a temperature below its set value. The set value may be, for example, in the range of 40° F. to 50° F. When the voltage sensor 16 detects a utility power supply failure, if the temperature detected by the second temperature sensor 7 is not below its set value, then no signal to generator start input 30 is provided and the generator stop signal 26 remains active, preventing the generator from starting.

However, when the second temperature sensor 7 detects a temperature below the low temperature set value and the voltage sensor 16 senses a utility failure is herein described. In this situation, the generator stop signal 26 is not provided allowing the generator to start by transmission of a signal to the generator start signal input 30.

When the generator voltage sensor 31 detects an acceptable voltage from the generator 110 in FIG. 2, the generator voltage sensor 31 transmits a signal to stop the generator start signal 30, thereby disengaged the generator starter. Next, the automatic generator power switch 27 is sent a signal to transfer the source of the electrical power for the heating system to the generator. At this point, the heating system is now supplied power from the generator allowing the heating system to again supply heat.

Thereafter, either (a) the second temperature sensor 7 is above its set point indicating the temperature has reached the acceptable level, or (b) the voltage sensor 16 and voltage sensor timer 22 are satisfied because voltage is detected from the utility for a pre-determined time. In this situation, the generator stop signal 26 is sent to turn off the generator.

During a situation in which the temperature drops below a low temperature set point as determined by first temperature sensor 6 and second temperature sensor 7 and the generator 110 is absent or fails to supply power to the heating system 120, the controller 100 will transmit the purge signal to the purge valve actuators 21$_1$ to 21$_n$ depicted in FIG. 1 to purge liquid from the plumbing system 130 thereby preventing the fluid pipes from cracking or rupturing due to freezing. The purge controller 100 further causes the electronically-controllable shutoff valve 16 to close to prevent additional fluid to enter the plumbing system 130.

Although FIG. 3 depicts the use of Boolean logic circuit 200 for the operations of the purge controller 100 of FIG. 1, it should be readily understood that other controller types and configurations are capable of and may be used for the purge controller 100 including, for example, microprocessors, microcontrollers, gate array and field-programmable, remote processing devices, such as network-connected computers or servers including internet connected smart-home cloud computers or controllers, or any other local or remote single or group of components that would cause the production of the desired output signals for the purge controller operation.

Figure 4:
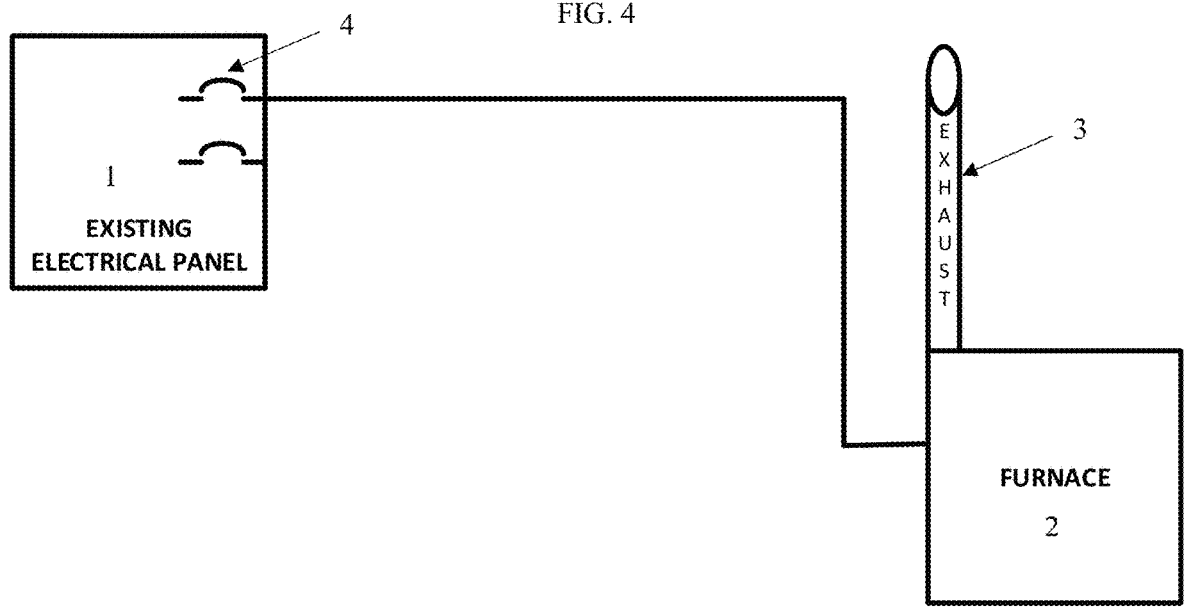
FIGS. 4-7 depicts schematic block diagrams of representative electrical installations of different exemplary purge controllers and plumbing system schematic systems.
Figure 5:
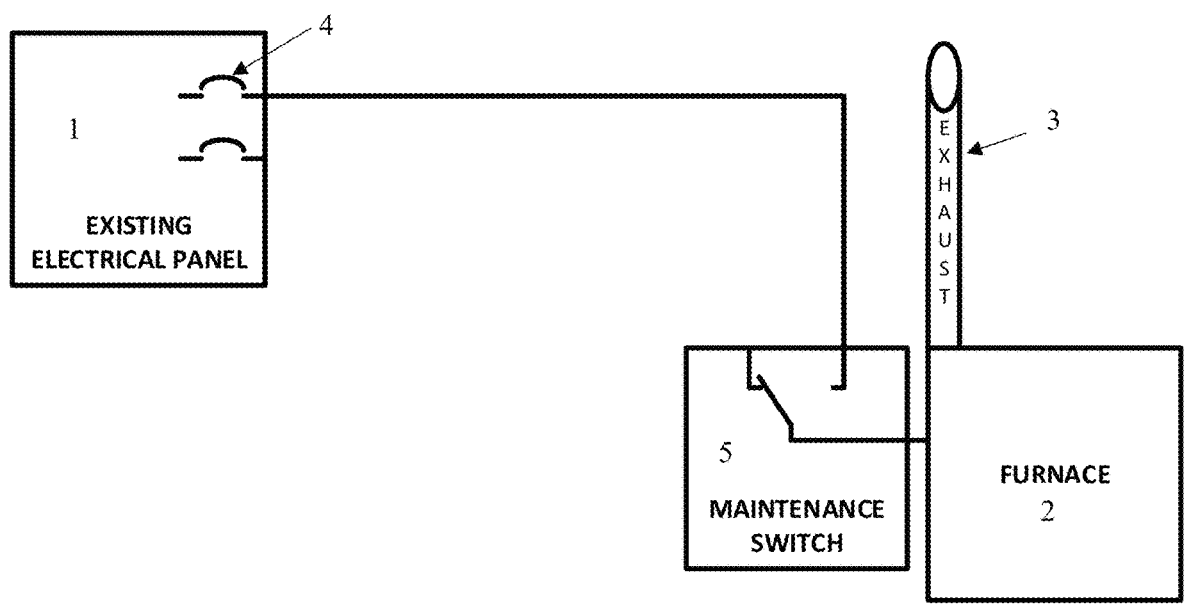

FIG. 4 depicts a typical installation of an electrical panel 1 with a circuit breaker 4 within electrical panel 1 supplying power to furnace 2 which is connected to an exhaust 3. FIG. 5 depicts an exemplary electrical installation of an exemplary system of the present invention with the optional heating system-dedicated standby generator, such as the generator 110 depicted in FIG. 2. This installation has the furnace 2 not directly connected to the circuit breaker 4 but instead connected to a maintenance switch 5. The maintenance switch 5 allows servicing of the system.

Figure 6:
Figure 7:
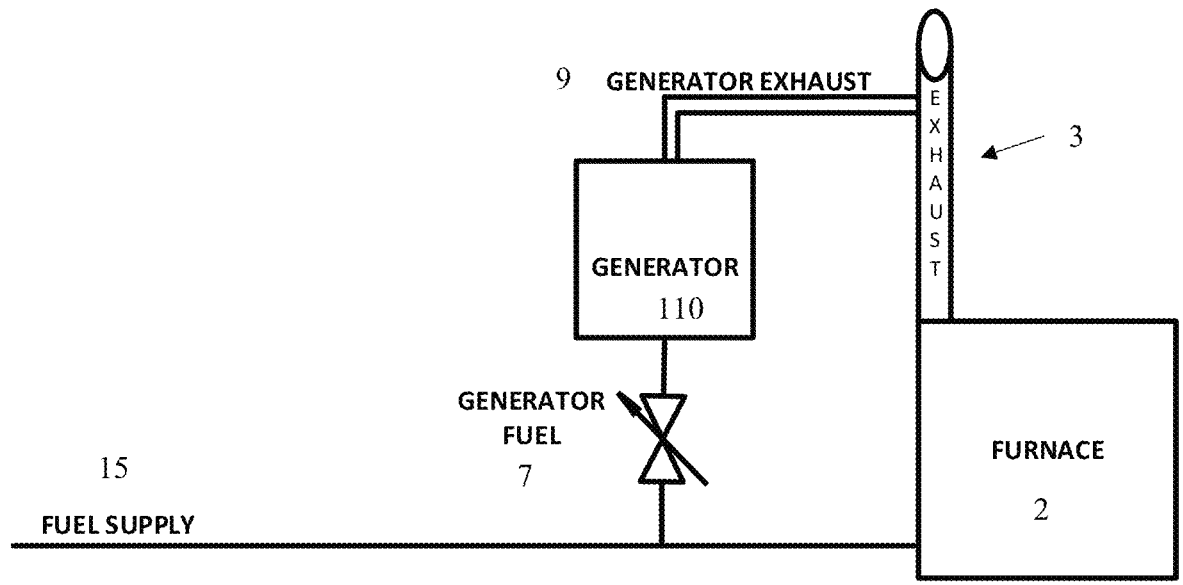

FIG. 6 depicts an exemplary mechanical installation of an exemplary system of the present invention which has a fuel supply 15 connected to the furnace 2. The furnace 2 has an exhaust 3 to the outside of the building. FIG. 7 depicts an exemplary mechanical installation of an exemplary system of the present invention in which the generator 110 uses the same generator fuel 7 as the furnace 2. It also uses the same exhaust as the furnace 2.

Fluid Purge System

In an exemplary system, an electronically-controllable shutoff valve 13 (depicted in FIG. 1) is capable of shutting off the main fluid (e.g., water) sources to a building. This is advantageous to prevent liquid from continuing to enter the building when one or more of purge valve actuators 21$_1$ to 21$_n$ (also depicted in FIG. 1) are activated. Purge valve actuators 21$_1$ to 21$_n$ may be installed on the plumbing system 130, such as on hot and cold water pipes, as well as the heating system plumbing system for fluid-based heating systems such as, for example, hot water heating systems, which may be heating system 120 depicted in FIG. 2. This allows the fluid in such pipes to drain further reducing the risk of frozen pipes resulting in additional damage.

To facilitate the drainage of the pipes air is allowed to enter the pipes to replace the liquid. This is done by, by for example, adding one or more electronically-controllable air inlet valves 35 or a mechanical check valve at high points of the plumbing system. Toilet tanks pose a particular risk of cracking in freezing temperatures, because they are normally full of water. To minimize the possibility of a toilet tank cracking, a check valve is installed in the fill inlet to such toilet tank (not shown). This check valve is oriented to permit water to flow only from the tank back into the fluid line connected to the fluid inlet when the water pressure within such fluid line substantially decreases, such as when fluid is purged from the plumbing system by the controller 100. In such orientation, this check valve does not allow water to enter the toilet tank from the fluid line.

Systems in accordance with this disclosure are designed to drain automatically but may be restored manually. To restore the fluid within the plumbing system 103 requires the purge valve actuators 21$_1$ to 21$_n$ that were opened to drain the system to be closed. This may be accomplished according to this invention by, for example, activating a switch or button on a control panel to communicate to the purge controller 100 that the purge valve actuators 21$_1$ to 21$_n$ be restore to their normal closed positions. After such valves are closed, the electronically-controllable shutoff valve 13 may likewise be restored to its normally-operating open position to permit fluid to once again enter the plumbing system. The controllable air inlet valves 35 and/or mechanical check valve allow the air in the pipes to exit as the pipes are filled with fluid. When the fluid level reaches the controllable air inlet valves 35 and/or mechanical check valve, such valves will electronically-operated to close or mechanically close preventing the liquid from escaping.

To properly drain the toilet tank requires allowing the tank to drain its water back into the supply line. To accomplish this, a check valve is installed at the bottom of the fill valve. The check valve blocks the water from entering the tank from the supply line but allows the tank to drain back into the supply line when the pressure in the supply line is removed. This happens when the purge valve actuators $21_1$ to $21_n$ in the supply line is opened. This removes the pressure in the supply line and allows the tank water to drain back through the check valve into the supply line.

Further, in order to prevent water present in the toilet bowl from freezing, antifreeze may be added to the toilet bowl when the purge valves in the plumbing system are activated and water is drained from the corresponding toilet tank. In one embodiment, a second float valve system may be installed in the toilet tank. The second float valve is set to open if the water in the tank is drained below the level that a conventional tank refill float valve operates, which occurs when the toilet tank is drained. The second float valve operates by dispensing the antifreeze stored in reservoir inside the toilet tank into the toilet bowl through the flush valve. This may be accomplished in a number of ways including, for example, dispensing the antifreeze through the top of the toilet overflow tube, or modifying or replacing the overflow tube with a tube having the capability for admitting the antifreeze into the toilet bowl.

The liquid drainage system such as purge controller 100 can also be operated manually, such as when the building is going to be vacant for an extended period of time. This may be accomplished by pressing a manual button in communication with the purge controller 100 to cause the controller to purge fluid from the plumbing system through one or more of purge valve actuators $21_1$ to $21_n$.

In embodiments of the present invention, a generator system is configured to supply power to a fuel-based heating system during a prolonged utility power outage. This is a more cost-effective solution than a whole house generator system and can be installed indoors. The generator system may be smaller, but sufficiently sized, to power aspects of the heating system such as solenoids, circulating pumps, air distribution system, and/or ignition system. Accordingly, generators producing in the range of, for example, 1 kW to 2 kW may be advantageously useable in such a system, which are significantly smaller and less costly than conventional standby generators used for powering building.

The generator may be supplied fuel from the same fuel source as the heating system. The fuel source can be propane, natural gas, number 2 fuel oil, or other suitable fuel sources. When the utility power fails, the purge controller may be configured to sense the loss of utility power and will automatically start the generator if the temperature at one or more temperature sensors is below a set threshold. If the temperature is above the set threshold, the purge controller generator system may be configured to not start the generator. When the utility power is restored and stable the generator system may be configured to shut down and return to a standby mode of operation in which it is ready to operate.

The system may be configured to be monitored remotely via wireless communications such that a user may use the internet or a cellular phone. The exhaust of the generator system may be connected to the exhaust of the heating system. The generator system may be packaged in a noise attenuated self-contained enclosure. Despite the purge controller transmitting signals to the generator to start generating electricity, if the generator does not start within a specified time of such signal transmission, and the temperature reaches a predetermined lower limit, the purge controller may transmit the necessary signals to purge the plumbing as described herein, for example, through one or more of purge valve actuators $21_1$ to $21_n$.

The generator system may advantageously additionally provide power to other critical low-power-consumption systems within the structure including, for example, sump pumps, Wi-Fi modem and/or router and security systems. With regard to the use of the generator system with the sump pump, it may be advantageous for the generator to activate when the water level within the sump rises above a threshold height to mitigate the risk of flooding upon loss of utility power despite ambient temperatures that may be above the first and second threshold temperatures. Such activation may be triggered based on electrical signals received from devices that monitor the water level in the sump, and/or when such water level reaches a threshold level that would normally cause the sump pump to activate, e.g., monitoring the position of sump pump float switch.

In other embodiments, several items of the generator system may be remotely monitored. These include: utility power available, generator running, temperature, and liquid detection, state of charge of the starting battery or batteries, and liquid system drainage activation.

A starting battery of a generator may be charged by a simple battery tender such as ones used for maintaining automobile starting batteries. The battery charger may be powered from the utility power or other standby generator.

In further embodiments, the invention includes a control system such a purge controller 100. One purpose of the control system is to determine when the generator system should run and supply electrical power to the heating system. The control system may be configured to monitor one or more of the availability of the utility power, the temperature of the inside air, the availability of the engine generator, and the position of the transfer switch. It may also may be configured to operate the transfer switch according to a source of power. If the utility power fails and the outside air is below the set point of the system, the control system may be configured to start the engine generator and transfer power from the failed utility source to the engine generator via the transfer switch.

The control system may consist of several parts working as a system. Such parts include voltage sensor for the utility and the engine generator, temperature sensors to monitor the outside temperature and a transfer switch that transfers power between the utility and engine generator may also be parts of the system. The system may also include a pipe drainage back up system that drains the cold and hot water pipes, for example, through one or more of purge valve actuators $21_1$ to $21_n$, if the engine generator does not start and a lower preset temperature is reached. The system may further include a logic control which is capable of receiving information and controlling the system accordingly.

It is to be understood that the invention is not limited to the particular embodiments of the invention described above, as variations of the particular embodiments may be made and still fall within the scope of the appended claims.

What is claimed is:

1. A purge controller for a plumbing system, the purge controller comprising:
    a processor;
    an interface adapter coupled to the processor, the interface adapter configured for electrical communication with an actuator of at least one purge valve incorporated within the plumbing system proximate to a drain outlet of such plumbing system;
    at least one temperature sensor adapted to transmit information indicative of a temperature to the processor, said temperature sensor for location proximate to at least a portion of the plumbing system; and a power input for receiving power from a primary power source to provide power to the processor and the interface adapter, wherein the processor is configured such that when the processor receives transmitted information from the at least one temperature sensor indicating that a corresponding detected temperature drops below a first threshold temperature, the processor causes the interface adapter to send a purge signal to the actuator of the at least one purge valve to activate such valve and purge fluid from the plumbing system into the drain outlet, wherein the processor is configured for communication with a controller of a dedicated standby generator adapted to activate and provide electrical power to a heating system upon a (a) loss of power from a power source to the heating system and (b) detection of a temperature proximate to the plumbing system that is below a second threshold temperature, and wherein the second threshold temperature is a temperature at or above the first threshold temperature.

2. The purge controller of claim 1, further comprising an air inlet check valve between a portion of the plumbing system and an air source, wherein when pressure within the plumbing system proximate to the valve falls below a threshold pressure, the check valve opens and admits air from the air source into the plumbing system.

3. The purge controller of claim 1, wherein the interface adapter is adapted for detection of a power loss to a heating system and wherein the processor causes the interface adapter to send a purge signal based, at least in part on, detection of a power loss to the heating system.

4. The purge controller of claim 1, wherein the processor is further configured to cause the interface adapter to transmit a shutoff signal to at least one actuator of an electronically-controllable fluid shutoff valve disposed within the plumbing system proximate to at least one fluid source.

5. The purge controller of claim 4, wherein the processor is adapted to cause the interface adapter to send the shutoff signal to the at least one actuator of an electronically-controllable shutoff valve prior to sending the purge signal.

6. The purge controller of claim 1 wherein the plumbing system is a component of a heating system.

7. The purge controller of claim 1, wherein the first threshold temperature is approximately 32° F. and wherein the first threshold temperature is adjustable by at least one of the processor or a user.

8. The purge controller of claim 1, wherein the first and second threshold temperatures within in the ranges of 32° F. to 37° F. and 40° F. to 50° F., respectively.

9. The purge controller of claim 1, wherein when the interface adapter is further adapted to receive a signal from the standby generator controller indicative of at least one of activation, or failure of activation of the standby generator upon a loss of power from the power source to the heating system.

10. The purge controller of claim 1, wherein the standby generator is adapted to generate power based on the same fuel source as that powers the heating system.

11. The purge controller of claim 1, wherein the purge controller is adapted to receive power from a backup power source from one of a battery, utility power or a generator upon loss of power to the purge controller from the primary power source.

12. The purge controller of claim 11, wherein the backup power source of the generator is a standby generator.

13. A purge controller for a plumbing system, the purge controller comprising:

a processor:

an interface adapter coupled to the processor, the interface adapter configured for electrical communication with an actuator of at least one purge valve incorporated within the plumbing system proximate to a drain outlet of such plumbing system:

at least one temperature sensor adapted to transmit information indicative of a temperature to the processor, said temperature sensor for location proximate to at least a portion of the plumbing system; and a power input for receiving power from a primary power source to provide power to the processor and the interface adapter, wherein the processor is configured such that when the processor receives transmitted information from the at least one temperature sensor indicating that a corresponding detected temperature drops below a first threshold temperature the processor causes the interface adapter to send a purge signal to the actuator of the at least one purge valve to activate such valve and purge fluid from the plumbing system into the drain outlet, wherein the plumbing system comprises a toilet check valve between a portion of the plumbing system and a toilet tank, wherein when pressure within the plumbing system proximate to the at least one purge valve falls below a threshold pressure, the toilet check valve opens and permits water from the toilet tank to flow back into the plumbing system, and wherein the toilet comprises a secondary float-actuated valve connected to an anti-freeze source, and wherein when the water level in the tank falls below a threshold level, the float-actuated valve operates to admit anti-freeze into a bowl of the toilet from the anti-freeze source.

14. A purge controller for a plumbing system, the purge controller
comprising:

a processor;

an interface adaptor coupled to the processor, the interface adaptor configured for electrical communication with actuators of purge valves within respective zones of the plumbing system proximate, said purge valves being proximate to at least one drain outlet of such plumbing system;

a plurality of temperature sensors with at least one of the temperature sensors proximate a respective one of the zones of the plumbing system, each of the temperature sensors adapted to transmit information indicative of a temperature proximate to said temperature sensor to the processor; and a power input for receiving power from a primary power source to provide power to the processor and the interface adaptor, wherein the processor is configured such that when the processor receives transmitted information from the at least one temperature sensor in a respective one of the zones indicating that a corresponding detected temperature dropped below a first threshold temperature for such zone, the processor causes the interface adaptor to send at least one purge signal to the corresponding actuator of the at least one purge valve within such zone to activate such valve and purge fluid from the corresponding zone of such plumbing system into the at least one drain outlet, and wherein the processor is configured for communication with a controller of a dedicated standby generator adapted to activate and provide electrical power to a heating system upon a (a) loss of power from a power source to the heating system and (b) transmitted information from the at least one temperature sensor in a respective one of the zones indicates a temperature that is below a second threshold temperature, and wherein the second threshold temperature is a temperature at or above the first threshold temperature.

15. The purge controller of claim 14, further comprising at least one air inlet check valve between a portion of the plumbing system and an air source, wherein when pressure within one of the zones of the plumbing system proximate to the valve falls below a threshold pressure, the check valve opens and admits air from the air source into the plumbing system.

16. The purge controller of claim 14, wherein the interface adaptor is adapted for detection of a power loss to the heating system and wherein the processor causes the interface adapter to send a purge signal to at least one of the purge valves based, at least in part on, detection of a power loss to a heating system.

17. The purge controller of claim 14, wherein the processor is further configured to cause the interface adaptor to transmit a shutoff signal to at least one actuator of an electronically-controllable fluid shutoff valve disposed within the plumbing system proximate at least one fluid source.

* * * * *